United States Patent
Joshi et al.

(10) Patent No.: US 12,554,731 B2
(45) Date of Patent: Feb. 17, 2026

(54) CONTEXTUAL RECOMMENDATIONS FOR DATA VISUALIZATIONS

(71) Applicant: Oracle International Corporation, Redwood City, CA (US)

(72) Inventors: Rutuja Joshi, Redwood City, CA (US); Lalitha Venkataraman, Bengaluru (IN)

(73) Assignee: Oracle International Corporation, Redwood City, CA (US)

( * ) Notice: Subject to any disclaimer, the term of this patent is extended or adjusted under 35 U.S.C. 154(b) by 55 days.

(21) Appl. No.: 18/472,769

(22) Filed: Sep. 22, 2023

(65) Prior Publication Data

US 2025/0103606 A1    Mar. 27, 2025

(51) Int. Cl.
*G06F 16/248*   (2019.01)
*G06F 16/22*   (2019.01)
*G06F 16/2457*   (2019.01)
*G06F 16/28*   (2019.01)

(52) U.S. Cl.
CPC .......... *G06F 16/248* (2019.01); *G06F 16/221* (2019.01); *G06F 16/24578* (2019.01); *G06F 16/287* (2019.01)

(58) Field of Classification Search
CPC ................. G06F 16/248; G06F 16/221; G06F 16/24578; G06F 16/287
See application file for complete search history.

(56) References Cited

U.S. PATENT DOCUMENTS

| | | | |
|---|---|---|---|
| 9,471,652 B1* | 10/2016 | Bangs | G06F 16/252 |
| 2016/0018974 A1* | 1/2016 | Welton | G06Q 10/10 |
| | | | 715/753 |
| 2017/0235848 A1* | 8/2017 | Van Dusen | G06Q 30/0201 |
| | | | 705/12 |
| 2018/0307992 A1* | 10/2018 | Chawla | G06F 16/9535 |
| 2019/0354599 A1* | 11/2019 | Mital | G06N 20/00 |
| 2019/0384762 A1* | 12/2019 | Hill | G06F 16/2272 |
| 2020/0004749 A1* | 1/2020 | Slezak | G06N 5/01 |
| 2022/0318224 A1* | 10/2022 | Thompson | G06V 10/70 |
| 2023/0081212 A1* | 3/2023 | Surendran | G06F 16/254 |
| | | | 707/736 |

* cited by examiner

*Primary Examiner* — Angelica Ruiz (57) ABSTRACT

Various embodiments of the present technology generally relate to systems and methods for generating contextual recommendations for data visualizations. In certain embodiments, a method may comprise operating a data analytics system to implement a contextual data visualization recommendation process configured to generate proposed data visualizations contextually relevant to a user. The method may include evaluating columns of a dataset for contextual relevance, including scoring the columns based on a canvas disposition scoring factor corresponding to which of the columns appear most frequently in a canvas of previously generated visualizations of the user, and scoring the columns based on a user reactions scoring factor corresponding to user action event data reflecting approval of visualizations and associated columns. The method may further include ranking the columns based on the evaluation, generating the proposed data visualizations based on a selection of highest-ranking columns, and providing the proposed data visualizations to the user.

20 Claims, 6 Drawing Sheets

CONTEXTUAL RECOMMENDATIONS FOR DATA VISUALIZATIONS

TECHNICAL FIELD

Various embodiments of the present technology generally relate to the generation and presentation of data visualizations via a data analytics service. More specifically, embodiments of the present technology relate to systems and methods for automatically generating contextual insight recommendations in generating new data visualizations based on a user's data and existing visualizations.

BACKGROUND

In data analytics software environments such as Oracle Analytics, users or clients (such as individuals, businesses, or data analytics software consumers) may enter or upload data, which the software may transform or clean into a unified format. The transformed data may then be used to generate visualizations, such as graphs, charts, diagrams, or other visual data depictions. Clients may be limited to employing a curated selection of pre-generated visualization options for their data, which may be published by authors such as business analysts that understand the data set and have sufficient knowledge of the visualization toolkit to build the workbooks of different visualizations. Client personas that have access to the tools to generate their own visualizations may still need to have in-depth knowledge of the data and how to create the visualizations using the available tools, and may need to devote extensive time and effort in creating the visualizations. Due to these limitations, consumers may largely rely on prebuilt content to gain insight on their data and drive business decisions, which may limit user data analysis capabilities. Accordingly, there exists a need for improved context-based insight recommendations for automatic generation of data visualizations relevant to the consumer.

The information provided in this section is presented as background information and serves only to assist in any understanding of the present disclosure. No determination has been made and no assertion is made as to whether any of the above might be applicable as prior art with regard to the present disclosure.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments herein relate to systems, methods, and computer-readable storage media for performing configuration data management. In an embodiment, a data analytics system may comprise one or more processors, and a memory having stored thereon instructions that, upon execution by the one or more processors, cause the one or more processors to implement a contextual data visualization recommendation process to generate proposed data visualizations contextually relevant to a user. The data analytics system may evaluate columns of a dataset for contextual relevance, including score the columns based on a canvas disposition scoring factor corresponding to which of the columns appear most frequently in a canvas of previously generated visualizations of the user, and score the columns based on a user reactions scoring factor corresponding to user action event data reflecting approval of visualizations and associated columns. The data analytics system may further rank the columns based on the evaluation, generate the proposed data visualizations based on a selection of highest-ranking columns, and provide the proposed data visualizations to the user.

In some embodiments, the data analytics system may further evaluate the columns for contextual relevance, including score the columns based on a key drivers scoring factor corresponding to other columns most correlated to first columns depicted in a first visualization from the canvas. The data analytics system may also score the columns based on a column statistics scoring factor corresponding to statistics of a type of data represented by the columns. In some examples, the data analytics system may further evaluate the columns for contextual relevance, including apply one or more selected multipliers to column scores from one or more corresponding scoring factors. In some embodiments, the data analytics system may rank the columns independently based on different scoring factors. For each column, the data analytics system may generate a combined score based on combining scores for a given column from different scoring factors. The data analytics system may rank the columns based on a corresponding combined score for each column. In some embodiments, the data analytics system may further evaluate the columns for contextual relevance, including categorize the columns based on a format of data in each column, and rank the columns based on the evaluation, further comprising sort the columns based on category. The data analytics system may rank the columns per category based on a combined score of each column in the category, and select the selection of highest-ranking columns, including pick a selected number of columns from each category having a highest combined score in the category. In some examples, the data analytics system may determine potential data visualizations available to create based on the selection of highest-ranking columns, score the potential data visualizations, and select the proposed data visualizations as a set of highest-scoring potential data visualizations. The data analytics system may determine a set of columns represented in a selected data visualization from the canvas, remove the set of columns from evaluation for contextual relevance, and generate the proposed data visualizations based on the set of columns and the selection of highest-ranking columns.

In an alternative embodiment, a method may comprise operating a data analytics system to implement a contextual data visualization recommendation process configured to generate proposed data visualizations contextually relevant to a user. The method may include evaluating columns of a dataset for contextual relevance, including scoring the columns based on a canvas disposition scoring factor corresponding to which of the columns appear most frequently in a canvas of previously generated visualizations of the user, and scoring the columns based on a user reactions scoring factor corresponding to user action event data reflecting approval of visualizations and associated columns. The method may further include ranking the columns based on the evaluation, generating the proposed data visualizations based on a selection of highest-ranking columns, and providing the proposed data visualizations to the user.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure. The following description and associated figures teach the best mode of the invention. For the purpose of teaching inventive principles, some aspects of the best mode may be simplified or omitted.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
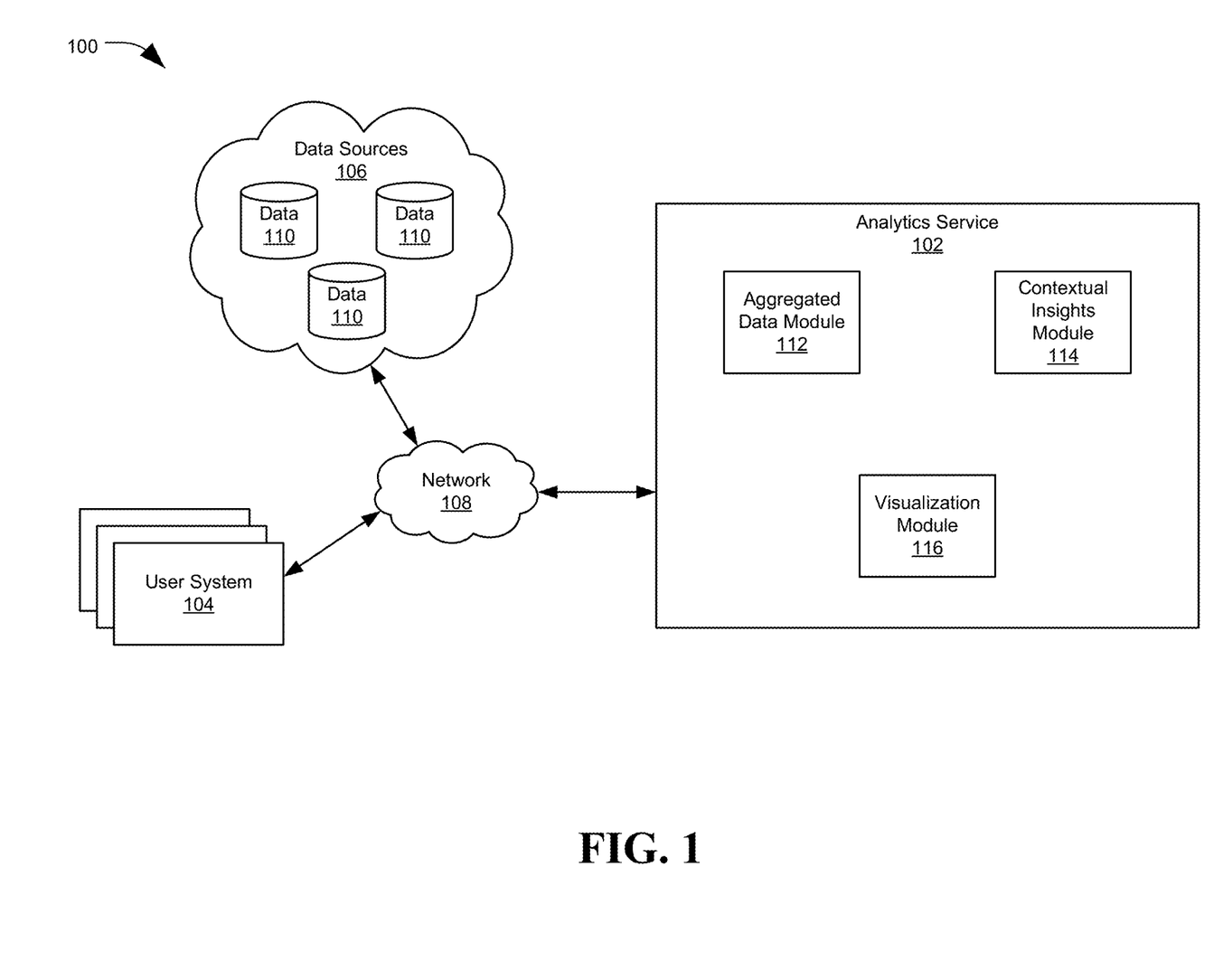
FIG. 1 is a diagram of a system configured to implement contextual recommendations for data visualizations, in accordance with certain embodiments of the present disclosure.

FIG. 1 is a diagram of a system 100 configured to implement contextual recommendations for data visualizations, in accordance with certain embodiments of the present disclosure. Generally, data analytics enables the computer-based examination or analysis of large amounts of data, in order to derive conclusions or other information from that data, and business intelligence tools (BI) provide an organization's business users with information describing their enterprise data in a format that enables those business users to make strategic business decisions. Data analytics and BI tools can be provided within the context of enterprise software application environments or within the context of software-as-a-service (SaaS) or cloud environments, such as, for example, Oracle Business Intelligence Applications (OBIA), Oracle Business Intelligence Enterprise Edition (OBIEE), Oracle Business Intelligence Server (OBIS), an Oracle Fusion Applications environment, Oracle Analytics Cloud (OAC) or Oracle Cloud Infrastructure environment, or other types of analytics application or cloud environments. Software vendors may offer enterprise software products or components as SaaS or cloud-oriented offerings, such as, for example, Oracle Fusion Applications; while other enterprise software products or components, such as, for example, Oracle ADWC, can be offered as one or more of SaaS, platform-as-a-service (PaaS), or hybrid subscriptions.

In accordance with an embodiment, a data warehouse environment or component, such as, for example, an Oracle Autonomous Data Warehouse (ADW), Oracle Autonomous Data Warehouse Cloud (ADWC), or other type of data warehouse environment or component adapted to store large amounts of data, can provide a central repository for storage of data collected by one or more business applications. For example, in accordance with an embodiment, the data warehouse environment or component can be provided as a multi-dimensional database that employs online analytical processing (OLAP) or other techniques to generate business-related data from multiple different sources of data. An organization can extract such business-related data from one or more vertical or horizontal business applications, and inject the extracted data into a data warehouse instance that is associated with that organization. Horizontal business applications can provide a broad scope of functionality across various enterprise organizations, and may include ERP (enterprise resource planning), HCM (human capital management), CX (customer experience), SCM (supply chain management), and EPM (enterprise performance management). Vertical business applications are generally narrower in scope that horizontal business applications, but may provide access to data that is further up or down a chain of data within a defined scope or industry. Examples of vertical business applications can include medical software, or banking software, for use within a particular organization.

The example system 100 may include a data analytics and visualization system such as Oracle Business Intelligence Server (OBIS), Oracle Analytics Cloud (OAC), and Fusion Analytics Warehouse (FAVV), although the present disclosure may apply to other data visualization systems. The system 100 may include an analytics service 102, one or more user systems 104, one or more data sources 106 including collections of data 110, and one or more networks 108 via which the components of the system 100 may communicate and exchange data. Elements of system 100 may be implemented via computers, servers, hardware and software modules, or other system components. Elements of system 100 may also include or have access to one or more data storage devices, data storage mediums, data storage servers, and related data structures such as databases, which may store data files, executable code, or other information.

User system 104 may include a client or user device via which a human operator may access and interact with analytics service 102. User system 104 may access analytics service 102 via network 108, which may include a wide area network (WAN) such as the internet, or a local area network (LAN) such as an office network. Analytics service 102 may be hosted remotely from user system 104, such as via a cloud service, or may be an on-premises service hosted at local servers or computing systems. In some examples, analytics service 102 may be implemented as software running on user system 104. A user may interact with the analytics service 102 via a user interface (UI) presented via user system 104. User systems 104 may include desktop computers, laptop computers, servers, smart personal devices, or other computing systems.

Data sources 106 may include one or more collections of data 110 that may be provided or uploaded to analytics service 102 (e.g., via network 108). Data sources 106 may include computer files (e.g., spreadsheet documents or database files), computer applications, cloud storage services, database hosting services, or other sources from which data 110 may be provided or accessed. Data 110 may include the actual information from the data sources 106. For an example of a business operation, the data 110 may include customer lists, sales data, shipping information, invoice information, employment records, or other data elements relevant to the business operations. A user may upload data 110 from the data sources 106 to the analytics service 102, over one or more networks 108, via a UI of user system 104 or analytics service 102.

Analytics service 102 may include a data analytics software application or system configured to gather and transform data 110, and then present aspects of the data to clients in the form of one or more visualizations (e.g., via a UI of user system 104). Accordingly, analytics service 102 may include an aggregated data module 112, a contextual insights module 114, and a visualization module 116.

The aggregated data module 112 may receive, process, and aggregate data 110 obtained from data sources 106, and may store the processed and aggregated data to a data storage system of the analytics service 102, at user system 104, or at another location accessible by analytics service 102. The aggregated data module 112 may receive the data 110 from one or more sources 106, which may also be in one or more data formats (e.g., different spreadsheet file formats, database systems, or other formats). The aggregated data module 112 may then process the data to transform it into a unified format that the analytics service 102 is configured to utilize, and may also check for or eliminate duplicative or redundant data, conflicting data, outdated data, or otherwise clean up the received data. The unified formation may include a columnar format, with each column of data representing a different type of value. For example, there may be a different column for each of customer identifier (ID), product type, product ID, product cost, sales, profits, ship dates, months, years, etc. The aggregated data may represent a dataset on which analytics can be performed and from which visualizations can be generated.

The visualization module 116 may be configured to generate visualizations to represent values from various columns of the dataset. Visualizations may include graphs, charts, diagrams, or other visual representations of data. For example, visualizations may include a bar chart of sales by customer segment, a heat map of sales by region, or other visual depictions of one or more of the columns from the dataset. By analyzing various visualizations, a user may be able to better grasp how various pieces of data from the dataset interrelate, and make better informed decisions. The visualization module may present a user with pre-configured visualization options that the user can view (e.g., designed or selected by an author persona of a business client). In some examples, the visualization module 116 may present a user with tools for selecting data columns and creating a visualization model by which to view the data. Visualizations, and optional design tools, may be presented to a user via a UI of user system 104. A user may create select multiple visualizations to retain, which collection of visualizations may be called a workbook, dashboard, canvas, or other term.

However, the selection of pre-configured visualizations available to a client may be limited, and the process of manually creating additional visualizations may be unavailable, difficult, or time-consuming. In order to provide improved data analytics and visualization options, the analytics service may include a contextual insights module 114. The contextual insights module 114 may automatically evaluate a number of factors from the dataset, the user's already selected visualizations, and other user feedback. Based on these factors, the contextual insights module 114 may determine which data columns would be of interest to the client, and generate a selection of visualizations (e.g., via visualization module 116) to recommend to the client. The client may add recommended visualizations to their workbook, provide feedback on whether they like or dislike recommended visualizations, request additional recommendations, or otherwise take advantage of context-based insights to the client dataset. By providing context-based visualization recommendations, the analytics service 102 may provide clients with greatly expanded data analysis options, that are automatically generated, and intelligently tailored to focus on data aspects that are of the greatest interest to the client. The contextual insights module 114 may apply ratification intelligence (AI) models or other computing algorithms to implement the context-based insights and visualization suggestions. An example process of evaluating which data columns are most relevant to a client is discussed in regard to FIG. 2.

Figure 2:
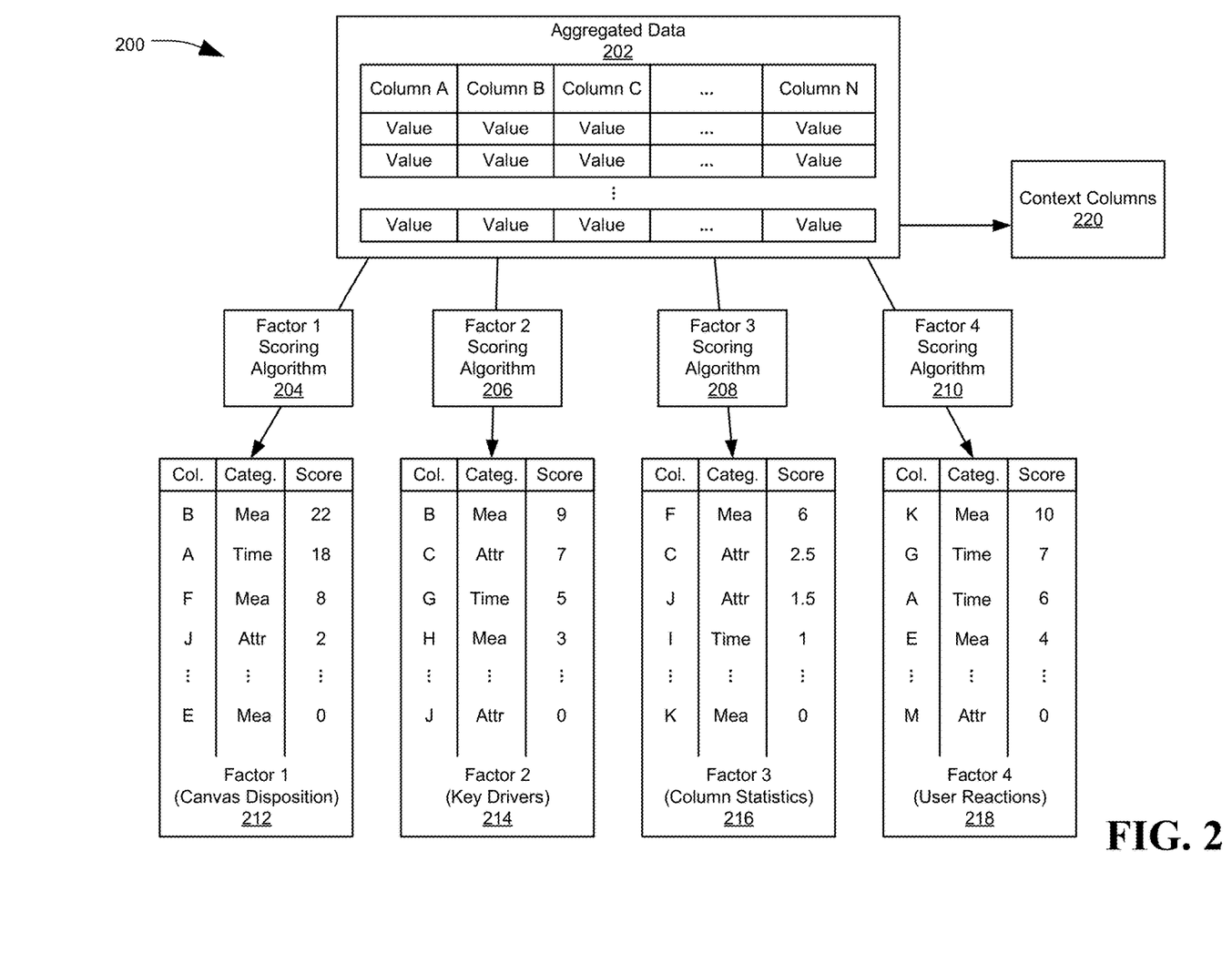
FIG. 2 is a diagram of a system configured to implement contextual recommendations for data visualizations, in accordance with certain embodiments of the present disclosure.

FIG. 2 is a diagram of a system 200 configured to implement contextual recommendations for data visualizations, in accordance with certain embodiments of the present disclosure. In particular, the example system 200 may depict a multi-factor scoring algorithm for data columns within a dataset. In the depicted example, aggregated data 202 may be processed using a plurality of scoring algorithms (e.g., factor 1 algorithm 204, factor 2 algorithm 206, factor 3 algorithm 208, and factor 4 algorithm 210) into a corresponding plurality of factor score "buckets" or lists (e.g., factor 1 bucket 212, factor 2 bucket 214, factor 3 bucket 216, and factor 4 bucket 218). Certain columns from aggregated data 202, may be excluded from some or all of the scoring algorithms, such as context columns 220, which may correspond to the columns included in a visualization that is currently selected or being viewed by a consumer. The column scoring process may be performed by components of an analytics service 102 of FIG. 1, such as the aggregated data module 112 and the contextual insights module 114.

In order to generate context-based insights for presenting useful visualizations to a consumer, the analytics service may perform an analysis and scoring process on the dataset to determine the most relevant and useful data columns to include in the visualizations. In the example of system 200, the analytics service may perform a multi-factor analysis and scoring algorithm on the dataset columns, and may weight the scores from the various factors by different amounts. The multi-factor scoring and weighting may enable the analytics service to determine and focus on the columns most likely to be relevant and useful to a consumer, while enhancing some of the most relevant factors and constraining the impact of less central factors.

Once data has been provided to or obtained by the analytics service, it may be transformed and normalized into an aggregated dataset 202 in a desired format. The aggregated data 202 may be organized based data columns, in some examples. In the depicted example, the aggregated data 202 may include a plurality of columns, including column A through column N. Each column may include data values of a particular type, such as a "date shipped" field, a "cost" field, a "product type" field, etc. The analytics service may then apply one or more scoring algorithms, corresponding to one or more factors, to the plurality of columns from the aggregated data 202. The columns may then be "ranked" or organized in one or more "buckets" or lists corresponding to the one or more scoring factors. In some examples, each scoring factor corresponds to a factor bucket, and the most relevant columns may be selected from these multiple buckets. In another example, a plurality of factor scoring algorithms may be used to compute a "total" or combined score for each column within a single bucket, and the most relevant columns may be selected based on the single bucket. Other embodiments are also possible.

In the example of system 200, four factors may be used in the data scoring algorithms 204-210. The example four factors may include factor 1—canvas disposition 212, factor 2—key drivers 214, factor 3—column statistics 216, and factor 4—user reactions 218, although more, fewer, or different scoring factors could be used in other embodiments. The scoring algorithms 204-210 may also apply a weight or multiplier to the score for each column based on the factor. For example, the factor 1 scoring algorithm 204 may apply a weight or multiplier of 2 to the column scores, the factor 2 scoring algorithm 206 and factor 4 scoring algorithm 210 may apply a weight of 1, and the factor 3 scoring algorithm 208 may apply a weight of 0.5. In this manner, factor 1"canvas disposition" 212, with a weight of 2, may be weighted more heavily and have a greater influence on the final selection of important columns, and factor 3, "column statistics", with a weight of 0.5, may have a reduced influence.

Factor 1, canvas disposition 212, may be based on which dataset columns appear most frequently on a consumer's canvas or dashboard. For example, if a consumer has six visualizations on their current dashboard, and dataset column B is included in four of the six visualizations, then column B may receive a high score from the factor 1 scoring algorithm 204. Columns that do not appear in any of the current visualizations may receive a low score, or a score of "0".

Factor 2, key drivers 214, may be based on which dataset columns are most correlated with a currently viewed or selected visualization. For example, the contextual data visualization recommendations suggested by the analytics service may change based on which visualization a consumer is currently viewing or interacting with. The factor 2 scoring algorithm 206 may determine which dataset columns are included in the current visualization, and then determine how correlated other columns from the dataset are to the current visualization columns. Which columns are most correlated can be inferred based on how related or interconnected the data from those columns are. As an example, if a user is viewing a visualization showing sales data over a product category (e.g., furniture vs. automobiles), the key drivers would be columns that makes the most sense in this context. Therefore, if furniture sells high in some regions (e.g., city or state), and cars sell high in other regions, then the "region" column may be a highly correlated column (and receive a high "key drivers" score) because it influences or correlates to sales for these products. Meanwhile, columns that do not show a strong correlation between sales data and product category may have a low "key drivers" score.

Factor 3, column statistics 216, may be based on various aspects or statistics of the type of data represented by a column. For example, the aspects or statistics may include base and advanced statistics on each column in the dataset like minimum, maximum, median, and mode values, data cardinality (e.g., the number of elements in a set), unicity (e.g., the uniqueness of each element), interquartile range (IQR), percentage of null values, Pearson coefficients, and so on. These statistics may help in identifying the nature of a column and the quality of the data it contains. These statistics may be fed to the factor 3 scoring algorithm 208, which may apply a list of predefined rules and eligibility criteria as part of determining a score for each column. Certain aspects are more useful for depicting in data visualizations than others, and those types of data may receive higher scores from the factor 3 scoring algorithm 208. The factor 3 scoring algorithm 208 may apply a list of predefined rules and eligibility criteria as part of determining a score for each column. For example, a column with very high unicity and cardinality may have a large number of unique values, which may indicate the column includes individual user or product IDs, which may not translate well to a visualization.

Factor 4, user reactions 218, may be based on user action events data and how it may indicate approval or disapproval for different visualization types or styles. For example, the analytics service UI may provide a mechanism for a user to rate or provide feedback on visualizations, dataset columns, or other aspects that may be used to evaluate what data to use in suggested visualizations. For example, a currently viewed (context) visualization, each visualization on a user dashboard, each visualization recommended to a user, or any combination thereof, may include a feedback option or button (e.g., a thumbs up or thumbs down) button. The analytics service may determine user-preferred data columns, visualization types or styles, or other preferences from the from the feedback. For example, if a user gives a "thumbs up" to a bar graph showing profit per month, the analytics service may favorably score a "profit" column, a "month" column, and potentially a "bar graph" visualization style. In other examples, user reaction 218 information can be inferred from an amount of time users spend interacting with a particular visualization, how often a type of visualization is added to user dashboards or canvases, or other user interactions that are not explicitly approval/disapproval based ratings. User reactions may be per-user, or may be gathered across groups of users (e.g., all users within a business department, within an entire business, within a business field, within a geographical region, across all users of the analytics service, etc.). Past user reaction data can influence future recommendations, and may optionally decompose over time (e.g., with more recent user reactions being weighted more heavily than older reactions), or evolve (e.g., a trend of "liking" similar columns may amplify the score for those columns).

As noted above, the scoring algorithms 204-210 may assign scores to the columns from the aggregated data 202 for each of the corresponding factor buckets 212-218. In some examples, some scoring algorithms may be applied at "runtime" while a user is interacting with data or when contextual visualization recommendations or insights are provided, such as for canvas disposition 212 (based on how often columns appear on a user's canvas) and user reactions 218 (based on active user feedback for columns). Other scoring algorithms may be applied or calculated ahead of time, such as key drivers 214 (based on highly correlated columns) and column statistics 216 (based on rating columns on a variety of statistics and attributes for their data elements). The columns may be ranked based on score in each of the factor buckets 212-218. The columns may be ranked within the factor buckets 212-218 based on the scores the columns received from the corresponding scoring algorithms 204-210.

In some examples, certain columns may be excluded from some or all of the factor scoring algorithms 204-210, which may limit processing necessary to generate suggested visualizations. The excluded columns may be represented in system 200 as context columns 220, which may refer to columns included in a visualization that is currently being viewed by a user, and which may provide the "context" for the suggested visualizations. The context columns 220 may be excluded because those columns may be considered pertinent to the user's current interests, regardless of or without the need to score those columns. So if the user is reviewing a visualization of sales per month, both the sales column and the month column may be considered relevant columns, and may be included in the pool of columns to use when generating suggested visualizations, even if those columns would not score highly according to the scoring algorithms 204-210. In some examples, the context columns 220 may be excluded from currently-calculated scores, but may have already been included in prior- or pre-calculated scores.

The contextual recommendation process may include selecting a number of top-scoring columns based on the scores from the factor buckets 212-218. As shown in system 200, each column may have a "category" type or designation. The category designation may refer to the category or format of the data in that column. In the depicted example, the three category types are "measure" (mea), "attribute" (attr), and "time". Measure data values may include metrics or numbers (e.g., sales, profit, units sold, etc.). Attribute data values may include non-mathematical or alphabetical values (e.g., city, product type, other noun or name labels, etc.). Time data values may refer to units of time measurement or chronology (e.g., hours, days, months, timestamps, etc.). The contextual recommendation process may select a selected number of top-scoring columns for each category from the factor buckets 212-218. For example, the system 200 may select the top two "measure" columns, the top two "attribute" columns, and the top two "time" columns from each bucket 212-218 to create a pool of column options for use in generating the suggested visualizations. If a column ranks highly in multiple buckets 212-218, it may be added to the "pool" multiple times or given a higher selection weight in the pool (potentially increasing the likelihood of selection for the proposed visualizations), or those columns may be added to the potential column pool only once without any additional weighting. If context columns 220 had been removed from the dataset columns for scoring, those context columns 220 may be re-added to a potential pool.

There may be additional ways to score and select columns for use in the recommended visualizations. For example, a combined score could be generated for each column based on the scores from each of the factor buckets 212-218 (e.g., based on adding all scores for a given column, multiplying them, or otherwise aggregating the scores), producing a combined ranking list for all columns. The top selected number of columns for each category could be selected from the combined list. In some examples, only columns that receive a score over a selected threshold in multiple factor buckets 212-218 may be selected or have their scores combined. Other embodiments are also possible. An example implementation of scoring that groups columns based on scores and categories is described in regard to FIG. 3.

Figure 3:
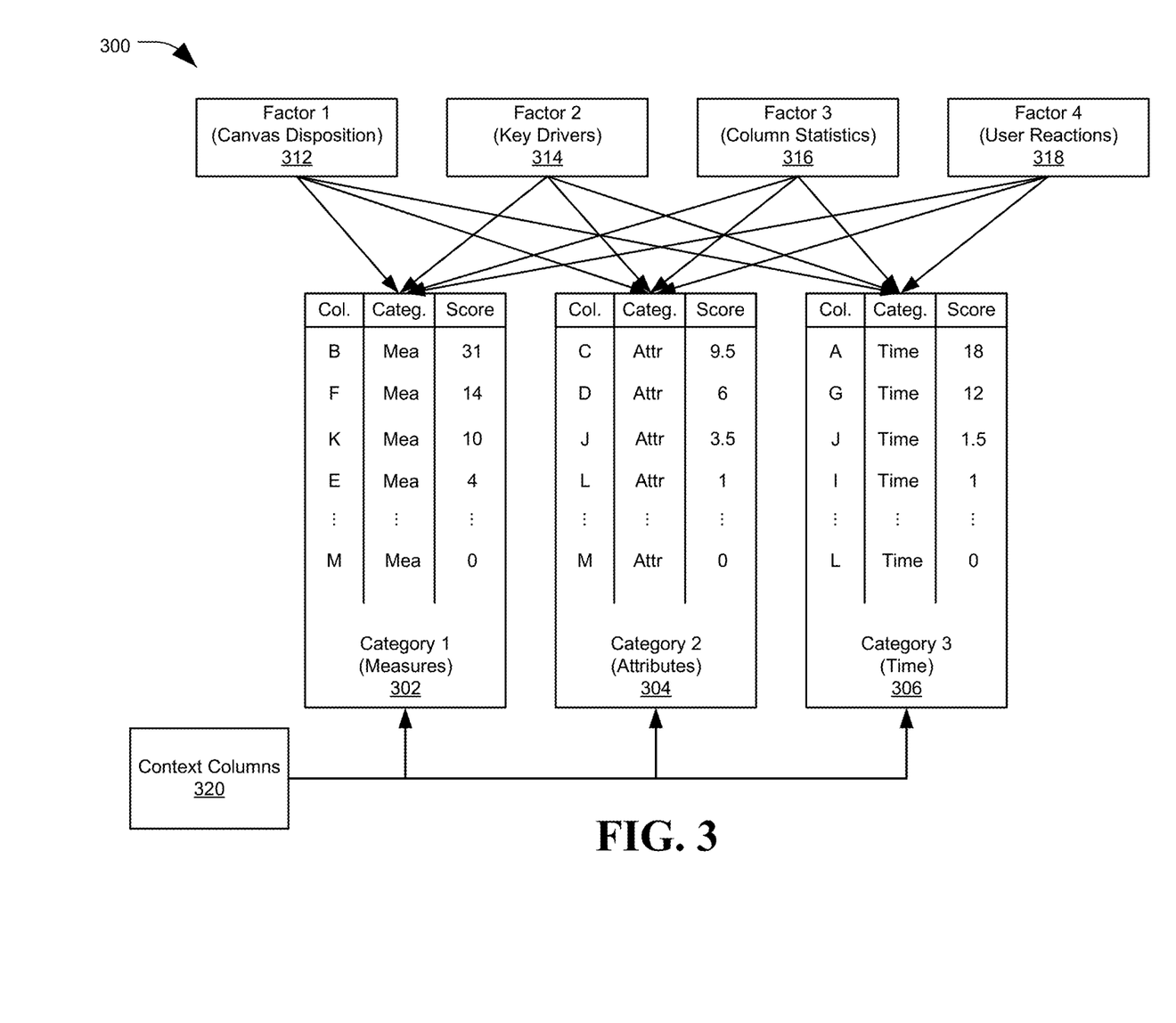
FIG. 3 is a diagram of a system configured to implement contextual recommendations for data visualizations, in accordance with certain embodiments of the present disclosure.

FIG. 3 is a diagram of a system 300 configured to implement contextual recommendations for data visualizations, in accordance with certain embodiments of the present disclosure. In particular, the example system 300 may depict a dataset column scoring algorithm configured to group columns based on a category of the data elements of the column. In the depicted example, a plurality of factor score "buckets" or lists are depicted, including, factor 1 bucket (canvas disposition) 312, factor 2 bucket (key drivers) 314, factor 3 bucket (column statistics) 316, and factor 4 bucket (user reactions) 318. These factor buckets 312-318 may correspond to the factor score buckets 212-218 of FIG. 2. System 300 may also include category buckets or lists, including category 1 (measures) 302, category 2 (attributes) 304, and category 3 (time) 306. The category buckets 302-304 may correspond to the categories of data columns described in FIG. 2. System 300 may also include a set of context columns 320, which may correspond to context columns 220 of FIG. 2. The system 300 of FIG. 3 may be implemented by components of an analytics service 102 of FIG. 1, such as the aggregated data module 112 and the contextual insights module 114.

As discussed in regard to FIG. 2, data columns from a dataset may be scored according to a plurality of factor scoring algorithms, with columns ranked in a different factor "bucket" 312-318 for each scoring algorithm. As also discussed above, each column may be categorized, based on the type of data in the column, as a measure, attribute, or time. In the example of system 300, the columns may be sorted and combined from the factor buckets 312-318, based on the categories, into the category buckets 302-306.

As an example, it may be assumed that the scores for each column from the factor buckets 312-318 may be added together to determine a column's total score. Column B from FIG. 2 is shown to be in the "measures" category. Column B received 22 points under the factor 1 scoring algorithm 204, and 9 points under the factor 2 scoring algorithm 206, and may be assumed (not shown) to have scored 0 points under the factor 3 scoring algorithm 208 and the factor 4 scoring algorithm 210. Accordingly, column B's combined score across all four factor buckets 212-218 may add up to 31 points. Column B may be sorted into the measures bucket 302 with 31 points. All other columns being scored may similarly have their scores combined and be sorted based on category into the category buckets 302-304.

In the depicted example, a selected number of top-scoring columns may be selected from each category bucket 302-306 for use in generating suggested visualizations. For example, the top three measure columns 302, the top three attribute columns 304, and the top two time columns 306 may be selected for a contextual visualization recommendation column pool. Once the selected number of columns are chosen from each category, the context columns 320 may additionally be added to recommendation column pool. In another embodiment, the selected number of columns for each category may be a maximum, and any columns from the context columns 320 may exclude the corresponding number of category columns from the category buckets 302-306. For example, if the system 300 selects up to three measures, three attributes, and two time columns, and the context columns 320 include a measure and a time column, then only two measures and one time column may be selected from buckets 302 and 306, respectively, while three attribute columns may be selected from attribute bucket 304. A flowchart of an example contextual recommendation for data visualizations process is depicted in FIG. 4.

Figure 4:
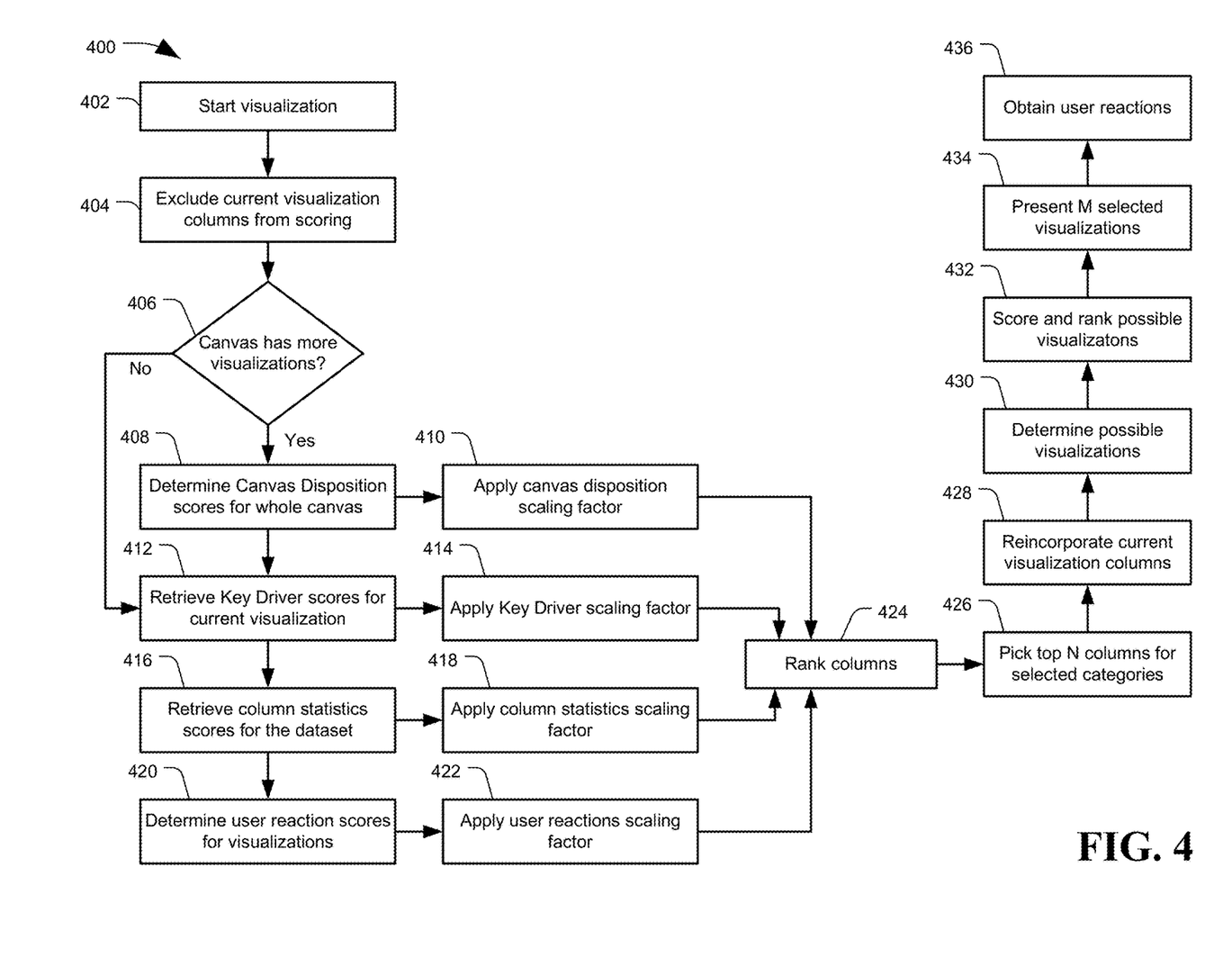
FIG. 4 depicts a flowchart of an example method to perform contextual recommendations for data visualizations, in accordance with certain embodiments of the present disclosure.

FIG. 4 depicts a flowchart 400 of an example method to perform contextual recommendations for data visualizations, in accordance with certain embodiments of the present disclosure. In particular, FIG. 4 may illustrate a process flow by which columns of a dataset are scored for contextual relevance, and used to generate data visualization recommendations. The method may be performed by devices and systems described herein, such as analytics service 102, the aggregated data module 112, the contextual insights module 114, and the visualization module 116 of FIG. 1.

The method may start at 402, and include starting a visualization operation or program. This may include a user of a user system 104 opening a user interface (UI) for an analytics service 102, uploading or linking data to the analytics service 102 to generate an aggregated dataset, opening a dashboard or canvas of one or more data visualizations, or any combination of operations that include initiating data visualizations for a data set. Starting a visualization may include a user selecting an option or requesting that context-specific data visualizations be suggested or presented to the user.

At 404, the method may include dataset columns from a current visualization from a scoring operation. The columns used in a current visualization may be referred to as context columns, and the context columns may be deemed significant or relevant to a user's interests, regardless of scoring results. In some embodiments, all columns are scored, and the context columns are not excluded from scoring, or the context columns may only be excluded from certain scoring operations (such as those scores calculated on-the-fly or currently, as opposed to pre- or prior-calculated scores).

The method may include determining whether the user's canvas or dashboard has more visualizations, in addition to the current or context visualization, at 406. If yes, the method may include determining canvas disposition scores for the whole canvas, at 408, and applying a selected canvas disposition scaling factor, at 410. As discussed above, canvas disposition may be based on which dataset columns appear most frequently on a consumer's canvas or dashboard, and may refer to the factor of bucket 1 212 of FIG. 2. Determining the canvas disposition scores, at 408, and applying the canvas disposition scaling factor, at 410, may correspond to the factor 1 scoring algorithm 204 described in regard to FIG. 2. All columns undergoing scoring under the method of FIG. 4 may receive a score for canvas disposition, and may be ranked in a canvas disposition factor bucket or list.

If the canvas has no other visualizations beyond the current visualization, at 406, or after determining the canvas disposition scores for the canvas, at 408, the method may include retrieving key driver scores for the current visualization, at 412, and applying a selected key driver scaling factor, at 414. As discussed above, key drivers may be based on which dataset columns are most correlated with a currently viewed or selected visualization, and may refer to the factor of bucket 2 214 of FIG. 2. Determining the key drivers scores, at 412, and applying the key drivers scaling factor, at 414, may correspond to the factor 2 scoring algorithm 206 described in regard to FIG. 2. In some examples, key driver scores may be pre-calculated. For example, the columns most correlated to other columns in the dataset may be calculated or determined when the dataset is created or uploaded, or when a visualization is first created. The scores may then be retrieved during the method of FIG. 4, rather than calculated on the fly. All columns undergoing scoring under the method of FIG. 4 may receive a score for key drivers, and may be ranked in a key drivers factor bucket or list.

At 416, the method may include retrieving column statistics scores for the columns of the dataset, and applying a selected column statistics score scaling factor, at 418. As discussed above, column statistics may be based on various aspects or statistics of the type of data represented by a column (such as unicity, cardinality, etc.), and may refer to the factor of bucket 3 216 of FIG. 2. Determining the column statistics scores, at 416, and applying the column statistics scaling factor, at 418, may correspond to the factor 3 scoring algorithm 208 described in regard to FIG. 2. As with key drivers, the column statistics scores may be pre-calculated when the dataset is created or uploaded. The scores may then be retrieved during the method of FIG. 4, rather than calculated on the fly. All columns undergoing scoring under the method of FIG. 4 may receive a score for column statistics, and may be ranked in a column statistics factor bucket or list.

At 420, the method may include determining user reaction scores for the visualizations in the dashboard or canvas, and applying a selected user reactions scaling factor, at 422. As discussed above, user reactions scores may be based on user action events data and how it may indicate approval or disapproval for different visualization types or styles, and the columns associated with the visualizations, and may refer to the factor of bucket 4 218 of FIG. 2. Determining the user reactions scores, at 420, and applying the user reactions scaling factor, at 422, may correspond to the factor 4 scoring algorithm 210 described in regard to FIG. 2. All columns undergoing scoring under the method of FIG. 4 may receive a score for user reactions, and may be ranked in a user reactions factor bucket or list.

Once the columns have been scored and scaled according to the various factors (408-422), the method may include ranking the columns, at 424. The columns may be ranked within the factor buckets (e.g., 212-218 of FIG. 2), so that each factor bucket has a ranking of all columns of the dataset based on the scores assigned for that factor. In another example, the columns may be sorted based on the categories of the columns (e.g., as with category buckets 302-306 of FIG. 3), with the factor scores for each column being combined to reach a total or final score for each column. The columns may then be ranked within the category buckets. In yet another example, the factor scores for each column may be combined to obtain a total or final score for each column, and all columns may be ranked within a single unified bucket or list. Other column ranking options are also possible.

Once the columns have been ranked, the method may include picking a top "N" columns for each of a selected number of column categories, at 426. As discussed above, the column categories may be based on a type of data for each column, such as measures, attributes, and time categories. The number of columns to select for each category may be different. For example, A total of 3 measure columns, 2 attribute columns, and 1 time column may be selected (e.g., per factor bucket, or total if the factor buckets are combined into category buckets or a unified bucket prior to final ranking). The selected columns may comprise a pool of columns from which suggested visualization can be created.

If columns from a current visualization were excluded from the scoring at 404, those columns may be reincorporated into the suggested columns pool, at 428. The excluded columns may be added to the "N" columns selected at 426, or may be included in reaching the "N" selected columns.

As described above, the scaling factors applied for each scoring factor (at 410, 414, 418, and 422) may be adjusted based on importance of each scoring factor in determining which data columns are most relevant in generating contextual recommended visualizations for a user. In some examples, columns may be scored and ranked for each factor bucket, and the scaling may be applied only to the columns selected from each factor bucket for use in generating recommending visualizations (e.g., the top N columns for each column category for each factor bucket). Other orders of scoring, scaling, ranking, and selecting columns than those presented in the example embodiments herein may be implemented without departing from the scope of this disclosure.

At 430, the method may include determining possible visualizations that can be constructed from the selected pool of top-ranking columns. The number of potential visualizations that can be constructed from the pool may be large. Accordingly, at 432, the method may include scoring and ranking the possible visualization, in order to limit the number of visualizations to suggest to the user. As an example of factors that may influence visualization scoring, a bar chart showing profit by city that has minimal profit differences between cities may be a poor visualization. Visualizations that depict greater correlation differences between the column datapoints may be more useful. In another example, prior user reactions to other visualizations may indicate which types of visualizations a user prefers. The potential visualizations may be scored using logical SQL (structured query language) queries in order to obtain a numerical value, and the scores may be ranked to pick the desired number "M" of suggested visualizations to present (e.g., by selecting the nine visualizations having the highest scores). The method may include presenting the M selected visualizations to the user, at 434, for example via a UI of the analytics service.

At 436, the method may include obtaining user reactions. For example, any suggested visualizations that the user chooses to add to their dashboard may be counted as a favorable user reaction to the selected visualizations and their associated columns. At any point, user reactions may also be gathered for visualizations based on user selections (e.g., thumbs up or thumbs down button inputs) or other user activity (which visualizations are added to a dashboard, which visualizations the user spends the most time interacting with, etc.). The user reaction scores can be stored as metadata of the analytics service and used as part of the "user reactions" factor scoring for future contextual data visualization recommendations. An example UI for depicting the contextual data visualization recommendations is depicted in FIG. 5.

Figure 5:
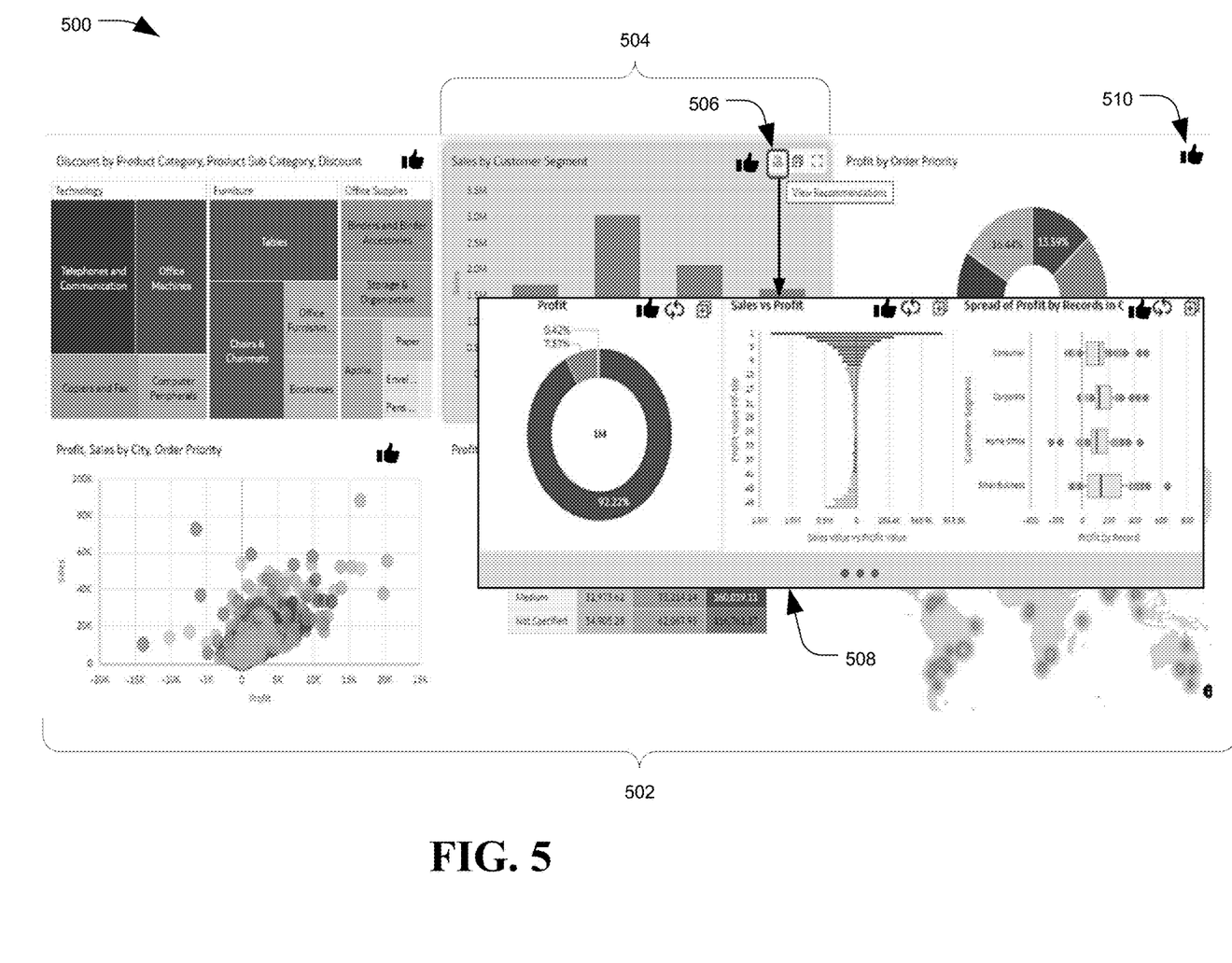
FIG. 5 is a diagram of a system configured to implement contextual recommendations for data visualizations, in accordance with certain embodiments of the present disclosure.

FIG. 5 is a diagram of a system 500 configured to implement contextual recommendations for data visualizations, in accordance with certain embodiments of the present disclosure. In particular, the example system 500 may depict a user interface (UI) of an analytics service configured to provide contextual data visualization recommendations based on a user's current visualizations and behavior. The system 500 of FIG. 5 may be implemented by components of user system 104 an analytics service 102 of FIG. 1, such as the aggregated data module 112, the contextual insights module 114, and the visualization module. For example, visualizations generated by or stored at analytics service 102 may be accessed by user system 104 (e.g., over network 108) and displayed on a screen or monitor of user system 104.

The system 500 may include a dashboard or canvas 500 depicting one or more visualizations that a user may have selected or had pre-configured for them. A user may select one of the visualizations as a current or context visualization 504, which may influence some of the scoring factors when generating suggested visualizations, as described herein.

One or more of the visualizations on the dashboard 502, such as the current visualization 504, may include buttons, icons, or other UI elements that a user can select to interact with the analytics service and the contextual data visualization recommendation functionality. In the depicted example, a button 506 may request that the analytics service generate a set of recommended visualizations 508 based on the associated current visualization 504. In response to the button 506, the analytics service may score columns of the dataset associated with the visualizations on the dashboard 502 and the current visualization 504, use artificial intelligence, insights, and scoring to select a set of most relevant columns for the user, and generate a set of suggested visualizations 508 that the user may find useful. Although three visualizations are depicted, the number of selected visualizations may be higher (e.g., nine visualizations, with three visualizations per suggestion page with three suggestion pages) or lower, or a user may be able to select the number of visualizations that are suggested. A user may be able to select suggested visualizations to add to their dashboard or canvas 502, or to review as a current or context visualization 504.

Another button or icon, such as a thumbs up icon 510, may be used by a user to provide user reactions information that can influence column scoring for the recommended visualizations. For example, data columns involved in a visualization to which the user provides a user reaction may have a "user reactions" score adjusted based on the reactions. In another example, the visualizations a user has added to their dashboard 502, or which visualizations a user spends most time interacting with as a current or context visualization 504, may also provide user reactions feedback to the analytics service. A computing system configured to perform the operations and methods described herein is provided in regard to FIG. 6.

Figure 6:
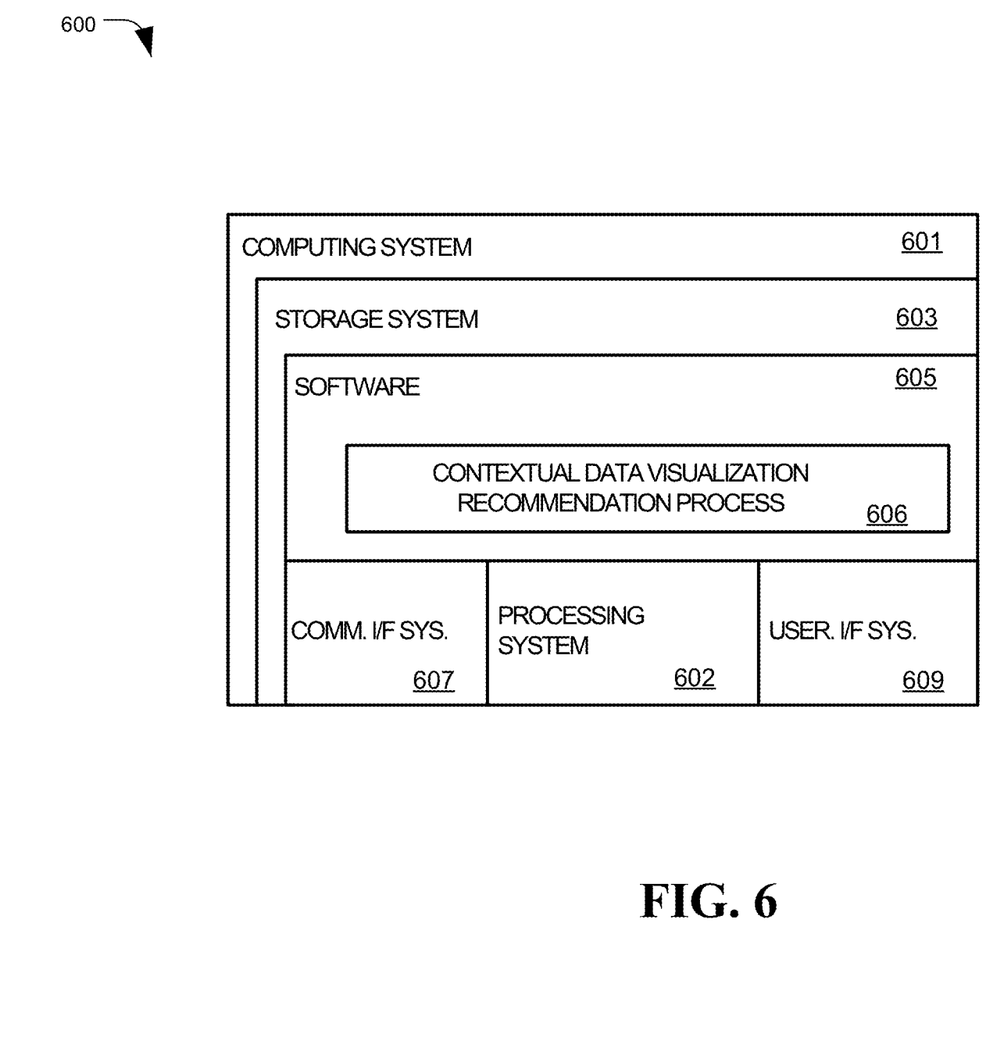
FIG. 6 is a diagram of a system configured to implement contextual recommendations for data visualizations, in accordance with certain embodiments of the present disclosure.

FIG. 6 illustrates an apparatus 600 including a computing system 601 that is representative of any system or collection of systems in which the various processes, systems, programs, services, and scenarios disclosed herein may be implemented. For example, computing system 601 may be an example, user system 104, data sources 106, network 108, analytics service 102, aggregated data module 112, contextual insights module 114, or visualization module 116 of FIG. 1. Examples of computing system 601 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing system 601 may be implemented as a single apparatus, system, or device or may be implemented in a distributed manner as multiple apparatuses, systems, or devices. Computing system 601 may include, but is not limited to, processing system 602, storage system 603, software 605, communication interface system 607, and user interface system 609. Processing system 602 may be operatively coupled with storage system 603, communication interface system 607, and user interface system 609.

Processing system 602 may load and execute software 605 from storage system 603. Software 605 may include and implement contextual data visualization recommendation process 606, which may be representative of any of the operations for transforming or homogenizing data into a dataset, evaluating columns of the dataset, visualizations on a user's dashboard or canvas, user reactions, or any combination thereof to determine relevant data and visualizations to suggest to a user, as discussed with respect to the preceding figures. When executed by processing system 602, software 605 may direct processing system 602 to operate as described herein for at least the various processes, operational scenarios, and sequences discussed in the foregoing implementations. Computing system 601 may optionally include additional devices, features, or functionality not discussed for purposes of brevity.

In some embodiments, processing system 602 may comprise a micro-processor and other circuitry that retrieves and executes software 605 from storage system 603. Processing system 602 may be implemented within a single processing device but may also be distributed across multiple processing devices or sub-systems that cooperate in executing program instructions. Examples of processing system 602 may include general purpose central processing units, graphical processing units, application specific processors, and logic devices, as well as any other type of processing device, combinations, or variations thereof.

Storage system 603 may comprise any memory device or computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device but may also be implemented across multiple storage devices or sub-systems co-located or distributed relative to each other. Storage system 603 may comprise additional elements, such as a controller, capable of communicating with processing system 602 or possibly other systems.

Software 605 (including contextual data visualization recommendation process 606 among other functions) may be implemented in program instructions that may, when executed by processing system 602, direct processing system 602 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtualization software, or other application software. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to implement a bundled binding audit process as described herein. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

While some examples provided herein are described in the context of Kubernetes containerized software environments, it should be understood the systems and methods described herein for configuration data management are not limited to such embodiments, and may apply to a variety of other containerized or virtualized software environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

Unless the context clearly requires otherwise, throughout the description and the claims, the words "comprise," "comprising." and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein." "above." "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A data analytics system, comprising:
  one or more processors; and
  a memory having stored thereon instructions that, upon execution by the one or more processors, cause the one or more processors to implement a contextual data visualization recommendation process to suggest new proposed data visualizations contextually relevant to a user, the contextual data visualization recommendation process including:
  evaluate columns of a dataset for contextual relevance to determine which data is of greatest interest to the user, including:
    score the columns based on a canvas disposition scoring factor corresponding to which of the columns appear most frequently in a canvas of previously generated visualizations of the user, indicating which data columns the user has previously utilized the most;
score the columns based on a user reactions scoring factor corresponding to user action event data reflecting approval of visualizations and associated columns;
rank the columns based on the evaluation;
generate the proposed data visualizations based on a selection of highest-ranking columns; and
provide the proposed data visualizations to the user.

2. The data analytics system of claim 1, further comprising instructions that, upon execution, cause the one or more processors to:
further evaluate the columns for contextual relevance, including:
score the columns based on a key drivers scoring factor corresponding to other columns most correlated to first columns depicted in a first visualization from the canvas.

3. The data analytics system of claim 2, further comprising instructions that, upon execution, cause the one or more processors to:
further evaluate the columns for contextual relevance, including:
score the columns based on a column statistics scoring factor corresponding to statistics of a type of data represented by the columns.

4. The data analytics system of claim 3, further comprising instructions that, upon execution, cause the one or more processors to:
further evaluate the columns for contextual relevance, including:
apply one or more selected multipliers to column scores from one or more corresponding scoring factors.

5. The data analytics system of claim 4, further comprising instructions that, upon execution, cause the one or more processors to:
rank the columns based on the evaluation, further comprising:
rank the columns independently based on different scoring factors.

6. The data analytics system of claim 4, further comprising instructions that, upon execution, cause the one or more processors to:
for each of the columns, generate a combined score based on combining scores for a given column from different scoring factors.

7. The data analytics system of claim 6, further comprising instructions that, upon execution, cause the one or more processors to:
rank the columns based on the evaluation, further comprising:
rank the columns based on a corresponding combined score for each column.

8. The data analytics system of claim 7, further comprising instructions that, upon execution, cause the one or more processors to:
further evaluate the columns for contextual relevance, including:
categorize the columns based on a format of data in each column;
rank the columns based on the evaluation, further comprising:
sort the columns based on category; and
rank the columns per category based on a combined score of each column in the category; and
select the selection of highest-ranking columns, including:
pick a selected number of columns from each category having a highest combined score in the category.

9. The data analytics system of claim 8, further comprising instructions that, upon execution, cause the one or more processors to:
determine potential data visualizations available to create based on the selection of highest-ranking columns;
score the potential data visualizations; and
select the proposed data visualizations as a set of highest-scoring potential data visualizations.

10. The data analytics system of claim 9, further comprising instructions that, upon execution, cause the one or more processors to:
determine a set of columns represented in a selected data visualization from the canvas;
remove the set of columns from evaluation for contextual relevance; and
generate the proposed data visualizations based on the set of columns and the selection of highest-ranking columns.

11. A method comprising:
operating a data analytics system to implement a contextual data visualization recommendation process configured to suggest new proposed data visualizations contextually relevant to a user, the contextual data visualization recommendation process including:
evaluating columns of a dataset for contextual relevance to determine which data is of greatest interest to the user, including:
scoring the columns based on a canvas disposition scoring factor corresponding to which of the columns appear most frequently in a canvas of previously generated visualizations of the user, indicating which data columns the user has previously utilized the most;
scoring the columns based on a user reactions scoring factor corresponding to user action event data reflecting approval of visualizations and associated columns;
ranking the columns based on the evaluation;
generating the proposed data visualizations based on a selection of highest-ranking columns; and
providing the proposed data visualizations to the user.

12. The method of claim 11 further comprising:
evaluating the columns for contextual relevance further includes scoring the columns based on a key drivers scoring factor corresponding to other columns most correlated to first columns depicted in a first visualization from the canvas.

13. The method of claim 11 further comprising:
evaluating the columns for contextual relevance further includes scoring the columns based on a column statistics scoring factor corresponding to statistics of a type of data represented by the columns.

14. The method of claim 11 further comprising:
evaluating the columns for contextual relevance further includes applying one or more selected multipliers to column scores from one or more corresponding scoring factors.

15. The method of claim 11 further comprising:
ranking the columns based on the evaluation includes ranking the columns independently based on different scoring factors.

16. The method of claim 11 further comprising:
for each of the columns, generating a combined score based on combining scores for a given column from different scoring factors.

17. The method of claim 16 further comprising:
ranking the columns based on the evaluation includes ranking the columns based on a corresponding combined score for each column.

18. The method of claim 16 further comprising:
evaluating the columns for contextual relevance further includes categorizing the columns based on a format of data in each column;
ranking the columns based on the evaluation includes:
  sorting the columns based on category;
  ranking the columns per category based on a combined score of each column in the category; and
  selecting the selection of highest-ranking columns includes picking a selected number of columns from each category having a highest combined score in the category.

19. The method of claim 11 further comprising:
determining potential data visualizations available to create based on the selection of highest-ranking columns;
scoring the potential data visualizations; and
selecting the proposed data visualizations as a set of highest-scoring potential data visualizations.

20. The method of claim 11 further comprising:
determining a set of columns represented in a selected data visualization from the canvas;
removing the set of columns from evaluation for contextual relevance; and
generating the proposed data visualizations based on the set of columns and the selection of highest-ranking columns.

* * * * *